Nov. 15, 1966  G. FONDA-BONARDI  3,286,108
MAGNETO-HYDRODYNAMIC GENERATOR
Filed Dec. 21, 1961  2 Sheets-Sheet 1

INVENTOR.
Giusto Fonda-Bonardi
By Richard K. Ehrlich
Attorney

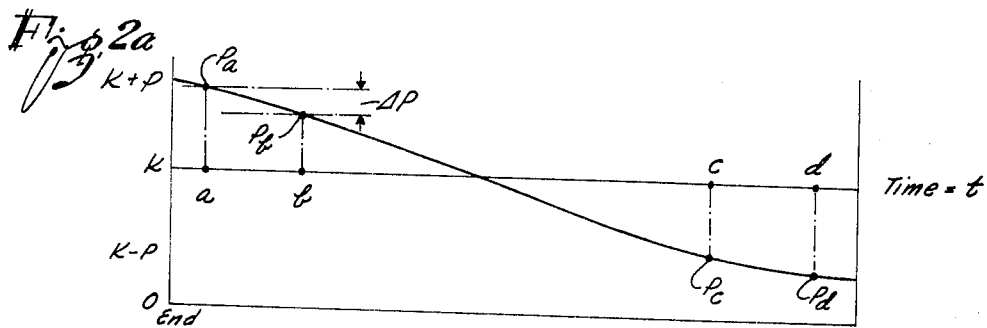
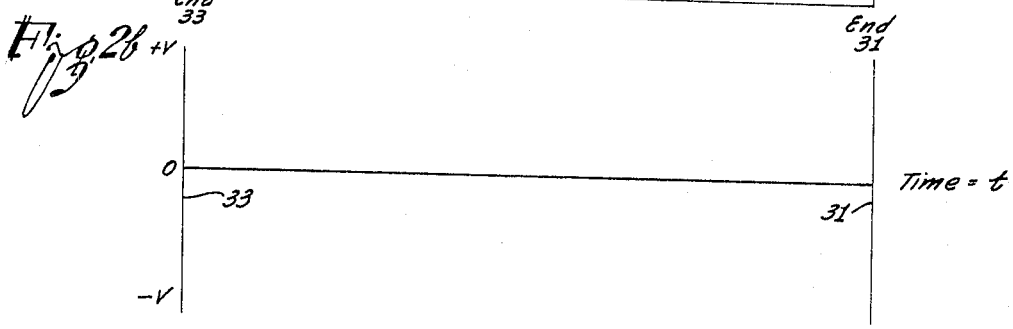
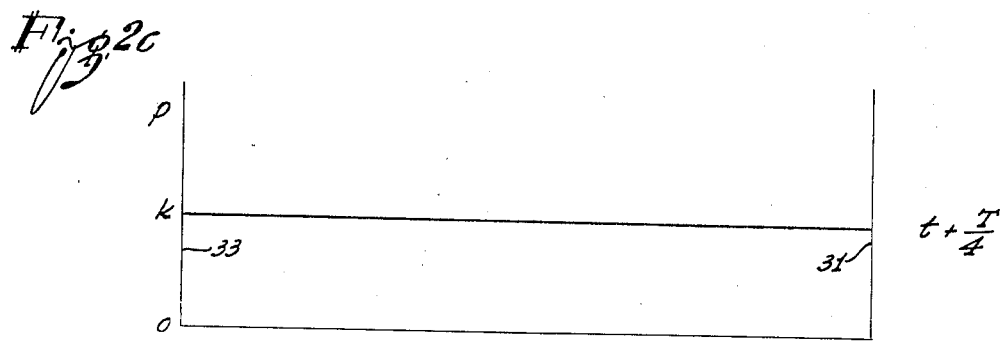
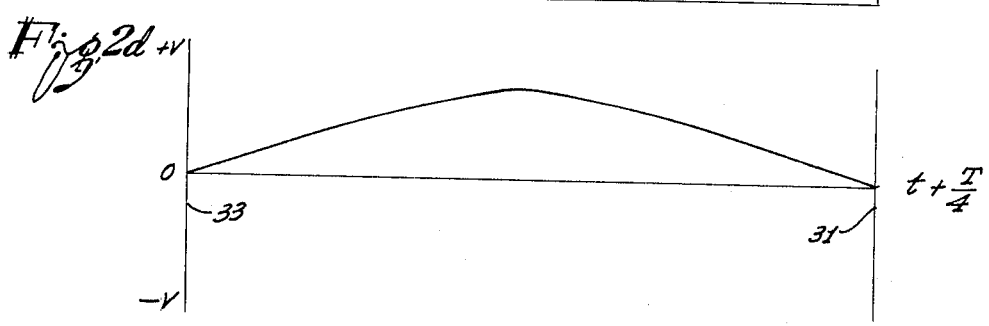
INVENTOR:
Giusto Fonda-Bonardi
Richard K. Ehrlich
Attorney

United States Patent Office 3,286,108
Patented Nov. 15, 1966

3,286,108
MAGNETO-HYDRODYNAMIC GENERATOR
Giusto Fonda-Bonardi, Los Angeles, Calif., assignor to Litton Systems, Inc., Beverly Hills, Calif.
Filed Dec. 21, 1961, Ser. No. 161,067
11 Claims. (Cl. 310—11)

The present invention relates to a highly efficient magneto-hydrodynamic generator and more particularly to a highly efficient magneto-hydrodynamic generator for converting the kinetic energy of ionized gas particles to an electromotive potential by reciprocating the gas particles back and forth across a magnetic field whereby the electromotive potential is generated.

In the last few years much effort has been directed towards the development of an electric generator capable of converting the kinetic energy of small particles such as atomic or molecular particles into electrical energy. While such a converter could have utility in any number of applications one of the more important uses is as a converter for converting the heat energy generated by nuclear reactors into electrical energy. Accordingly, it is apparent that an efficient converter of the foregoing type would have substantial utility in all fields of electrical energy generation.

One of the most promising of this type of energy converter presently under study is the magneto-hydrodynamic generator. The conventional D.C. magneto-hydrodynamic generator, more frequently referred to as an MHD generator, consists of a rectangular channel through which an ionized gas flows. A magnetic field is applied between opposite walls of the channel orthogonal to the direction of flow of the ionized gas so that in accordance with fundamental electromagnetic theory a voltage is generated between the other two opposite walls. Accordingly, if electrodes are connected to said other walls and a current is extracted therefrom, a small portion of the kinetic energy of the gas is transformed into electrical energy as the gas traverses the magnetic field.

However the efficiency of the device is rather low since the amount of energy converted is directly related to the ionization of the gas and for practical temperatures the ionization level is generally rather low. Accordingly, since the ionization level is low the power extracted per unit length must be low and if the length over which the magnetic field is applied to the gas is increased to attempt to increase the efficiency an extremely long device would be required.

Furthermore, extraction of much kinetic energy results in substantial speed reduction, whereas high efficiency is obtainable only if the gas is moving at a fast rate of speed. Hence, if a long device is used high efficiency can be obtained only at the beginning of the process since as the gas moves down the length of the device, the speed of the gas drops and the efficiency of the conversion process must necessarily drop with the speed. Hence, it is clear from the foregoing that the prior art MHD generators are inherently extremely low efficiency devices.

The present invention, on the other hand, provides a highly efficient magneto-hydrodynamic generator wherein the ionized gas mass is reciprocated back and forth through the magnetic field and the kinetic energy remaining in the ionized gas or plasma after it is passed through the magnetic field is recovered by recompression. In addition, the energy lost through conversion is replenished so that the gas is once again capable of being passed through the magnetic field at a high velocity. Accordingly, the kinetic energy of the plasma not converted on any single run through the magnetic field is not wasted but is, on the contrary, utilized along with additional energy to replace the converted kinetic energy to send the gas mass once again through the magnetic field at an efficient high speed. The recompression and incremental energy addition process is repeated so that the plasma can be continuously reciprocated back and forth through the magnetic field.

More particularly, the gas mass can be caused to oscillate back and forth through a magnetic field by placing it within a closed container and periodically actuating the gas mass by pressure pulsations at one end of the container at the resonant frequency of the container. For example, if the container is cylindrical in shape and closed at both ends, the container has substantially the same shape as a conventional organ pipe and accordingly operates in substantially the same manner.

More particularly, if the magnitude or amplitude of the gas pressure and velocity are examined at a selected time when the amplitude of the gas velocity along the direction of flow is at a maximum at the center of the container and zero at the ends of the container, it can be shown that the pressure all along the container has a uniform amplitude. However, due to the fact that the gas mass is moving toward one end of the container at a time ¼ of a cycle later, the pressure at one end of the container will be at a maximum while the pressure at the other end of the container will be at a minimum and the velocity amplitude all along the axis of flow will be zero. The pressure differential, however, will cause the gas mass to flow from the high pressure end of the container where substantially all the gas mass is located toward the low pressure end so that at a time ½ cycle from the initial selected time, the gas will again have a maximum velocity amplitude at the center of the tube but opposite in sense to that at the initial selected time. Furthermore, the pressure will again be uniform throughout the length of the container.

Hence, the system oscillates from a condition of uniform pressure and maximum velocity to a condition of maximum pressure differential between the ends of the tube and no velocity so that the kinetic energy of the gas mass is in a sense stored or recovered by transforming the kinetic energy of velocity into a pressure difference which, in turn, imparts a velocity to the gas in a direction opposite to its previous velocity. Thus the gas mass oscillates back and forth along the length of the cylindrical container or pipe at the resonant frequency of the container.

While a relatively efficient MHD generator of the invention can be mechanized with a cylindrical shaped container an even more efficient generator can be mechanized with a container having a general configuration with a maximum cross section at its ends and gradually diminishing cross section along the axis of flow to the center of the container, the small cross-sectional area at the center acting as a nozzle. Containers having this general configuration overcome the difficulty encountered in generating large amplitude pressure oscillations due to the compressibility of the gas mass. Accordingly since a larger amplitude pressure oscillation can be generated it is clear that an increased velocity amplitude can be produced so that the gas velocity at the throat or nozzle of the container is substantially increased. Hence, by positioning a magnetic field at the throat or nozzle of the container orthogonal to the gas flow, a maximum voltage can be generated by the system. It should be apparent in this regard that with a constant magnetic field an A.C. voltage can be easily generated since the direction of gas flow periodically reverses. However, if it is desired to generate a D.C. output it is only necessary to reverse the magnetic field generated across the throat of the container in phase with the direction of flow of the gas mass. In this manner, a rectified pulsating D.C. voltage is generated which can be filtered to provide a constant D.C. voltage.

In one embodiment of the invention, a double-funnelled shaped container having an ionized gas mass or plasma therein has an input heat exchanger coupled thereto at one end and a heat sink coupled thereto at the opposite end. In operation, oscillation of the gas mass is produced by the periodic injection of small increments of heat energy at one end of the container by the heat exchanger and the periodic extraction of increments of heat energy at the opposite end of the container by the heat sink, the periods of incremental additions and subtractions of heat being related to the acoustic resonant frequency of the container. The device is completed by placement of a permanent magnet adjacent the throat or neck of the container to develop a magnetic field across the throat perpendicular to the direction of gas flow whereby an electromotive potential is generated across the nozzle of the container as the gas oscillates back and forth within the container.

In another embodiment of the invention, a dumbbell shaped container having a gas mass contained therein has a pair of valves and a pair of injectors attached thereto, one of the valves and injectors being positioned on one end of the container and the other one of the valves and injectors being positioned on the opposite end of the container. In operation, the valves admit fresh air under pressure alternately to the container in accordance with the frequency of oscillation of the gas, while the injectors admit atomized fuel when the pressure developed by the oscillation is at its highest adjacent the injector. Accordingly, the oscillations are reinforced. Exhaust products are removed by an aperture or port in the container at the neck of the container.

Therefore, it is an object of the present invention to provide a highly efficient magneto-hydrodynamic generator.

It is another object of the present invention to provide an improved magneto-hydrodynamic generator.

It is a further object of the present invention to provide a magneto-hydrodynamic generator wherein an ionized gas mass is caused to reciprocate back and forth through a magnetic field.

It is still another object of the present invention to provide a magneto-hydrodynamic generator wherein the gas mass in a container has increments of energy added thereto at predetermined intervals to cause the gas mass to resonate back and forth within the container.

It is still a further object of the present invention to provide a magneto-hydrodynamic generator wherein the gas mass utilized to generate an electromotive force is capable of being reciprocated through the magnetic field by the addition of only small increments of energy to replace the energy previously transformed into electrical energy.

It is still a further object of the present invention to provide a magneto-hydrodynamic generator capable of producing an alternating current signal.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood however, that the drawings are for the purpose of illustration and description only, and are not intended as a definition of the limits of the invention.

FIGS. 2a through 2d are graphs of the pressure and velocity of a gas mass positioned in the generator shown in FIG. 1.

Figure 1:
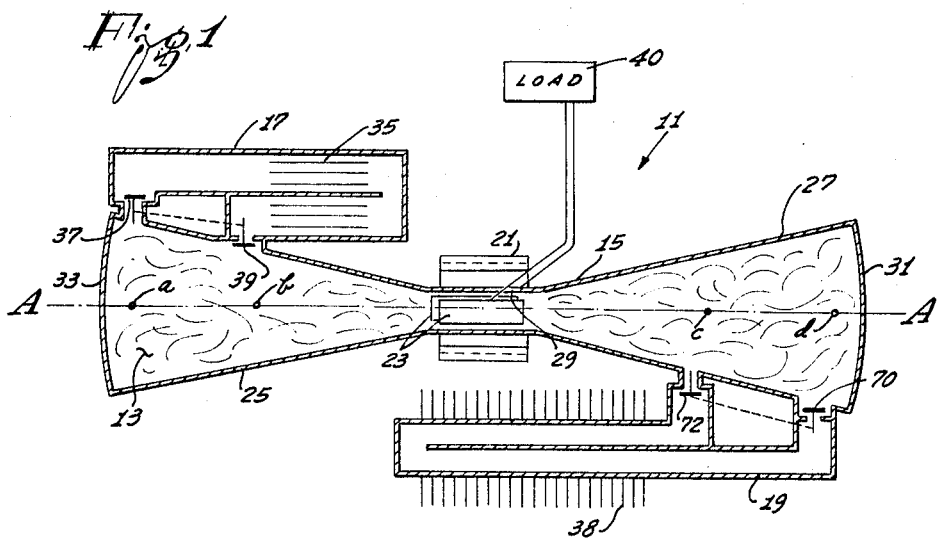
FIG. 1 is an illustrative view of a MHD generator of the invention.

Referring now to the drawings wherein like or corresponding parts are referred to with the same reference characters throughout the several views, there is shown in FIG. 1 an illustrated view of a magneto-hydrodynamic generator 11 which is operable to reciprocate a mass of gas 13 along an axis or direction of the flow A—A within a container 15 by means of the addition of increments of heat energy to the gas mass at one end of the container by a heating exchanger 17 and the extraction of increments of heat energy at the other end of the container by a heat sink or cooling exchanger 19 whereby the gas mass moves back and forth through a magnetic field generated by a magnet 21 to generate an electromotive potential across a pair of output plates 23. More particularly, the gas mass within container 15 is caused to oscillate within the container by periodic pulsations of pressure at the container ends (resulting from the addition and extraction of heat) in substantially the same manner as an air column is caused to oscillate within a conventional closed end organ pipe. The period of frequency of the pulsation corresponds, of course, to the resonant acoustical frequency of the container so that the oscillations are reinforced by the pulsations and the magnitude of the oscillations will accordingly be increased.

Considering that the gas is subject to compressibility it should be noted that the specific shape of container 15 is such as to permit a build up of relatively large amplitude oscillations. As is shown in FIG. 1, the container comprises two similarly shaped sections 25 and 27 interconnected at their small cross-sectional ends by a similarly reduced cross-sectional throat section 29 in such a fashion that the container goes from a maximum cross-sectional area at an end 31 of section 27 to a minimum cross-sectional area at throat section 29 and then again to the maximum cross-sectional area at an end 33 of section 25. It should be noted that not only does the configuration of container 15 lend itself to larger magnitude oscillations with a greater pressure recovery per cycle, but in addition, a large gas velocity is available at the throat section 29 due to the reduced cross-sectional area of the throat section. When it is realized that the magnitude of the electromotive potential generated by the ionized gas passing through the magnetic field generated by magnet 21 is directly related to the velocity of the gas, it is clear that the increased velocity in the throat section 27 of the container contributes to a more highly efficient device.

Referring now with particularity to FIGURE 2a—2d, there is shown in FIGURE 2a a graph of the amplitude variation of the gas pressure along the direction of flow A—A or length of the container at a time $t$ while in FIGURE 2b there is shown a graph of the gas velocity along the length of the container also at a time $t$. As is shown in FIGURE 2a, the amplitude of the gas pressure has a value K at the center of the container, the amplitude of the pressure gradually increasing along the direction of flow in one direction to a maximum amplitude of $(K+P)$ at end 33 of the container and gradually decreasing in the other direction to an amplitude of $(K-P)$ at end 31.

As is indicated in FIGURE 2b, at time $t$ the velocity of the gas mass is zero along the whole length of the container. However, due to the substantial difference in pressure existing at the two ends of the container, the gas commences to move from the high pressure end 33 toward the low pressure end 31 so that at time $(t+T/4)$, where T is the period of oscillation of the gas, the gas pressure has a uniform amplitude throughout the container, as is indicated in FIGURE 2c. However, as is indicated in FIGURE 2d the velocity curve has a maximum amplitude at the center or throat of the container, the velocity gradually diminishing in both directions from the center to zero velocity at the two ends.

Continuing with the discussion of the invention, it should be apparent that due to the fact that at time ($t+T/4$) the gas all along the length of the container is moving in a positive direction toward end 31 the gas wil accumulate at end 31 of the container so that at time $t+T/2$ the maxiumum pressure amplitude ($K+P$) will appear at end 31 while the minimum pressure amplitude will appear at end 33. In a like manner, the ½ cycle of operation just described will be reversed and the pressure and velocity distribution shown in FIGURES 2a and 2b will reoccur at time ($t+T$).

Accordingly, if an incremental amount of energy is added to the gas within section 25 at time $t$ and at each period thereafter the amplitude of the pressure oscillations will be reinforced whereby the oscillations will be sustained. It should be noted that while the system will continue to oscillate without the removal of energy, in order to keep the temperature of the gas and container from rising beyond a preselected level increments of energy are subtracted from the gas mass at time $t$ and at intervals of T thereafter by means of heat sink 19. Accordingly, not only is heat removed from the gas mass to maintain temperature of the gas in equilibrium but the pressure oscillations are reinforced thereby.

Examining the amount of energy that should be removed by heat sink 19 during each cycle of operation, it is first necessary to consider the efficiency of the generator. In this regard, if the amount of energy added per cycle is defined as $\Delta Q$ and the amount of energy removed per cycle is defined as $\Delta Q'$, it can be shown from basic thermodynamics that the efficiency of the generator is given by the following relationship:

$$\Delta Q - \Delta Q'/\Delta Q = \text{Efficiency}$$

If the generator is operated in such a manner that near sonic velocities are created within section 29 it can be shown that the Carnot efficiency of the complete cycle is approximately 23 percent, the actual efficiency depending on such additional factors as wall friction, dynamic losses in the transfer of the gas from the container to the plenum chambers of the heat exchangers, temperature drops in the exchangers, and resistive losses in the MHD generator. Accordingly, by setting Equation 1 equal to .23, the amount of energy that should be removed from the container during each cycle of operation for any magnitude of energy input can be calculated.

In regard to the specific operation and structure of exchangers 17 and 19 to perform the foregoing described incremental heat addition and removal operation numerous methods of mechanizing such heat exchangers will be readily apparent to one skilled in the art. For example, one such method is shown in FIGURE 1. As shown in FIGURE 1, exchanger 17 includes a plurality of heating coils 35 and a pair of valved openings or ports 37 and 39 located at points $a$ and $b$, respectively, along the direction of flow, which control the flow of gas out of container 15 into the exchanger and back into the container 15. In operation, coils 35 are connected to a source of heat energy such as a nuclear reactor and the valve openings are mechanized to permit heated gas to flow out of opening or port 39 while a portion of the cooler gas from the container flows into the exchanger through port 37.

Figure 3:
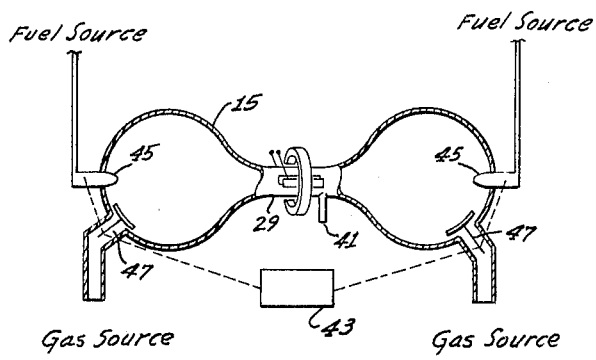
FIG. 3 is an illustrative view of another embodiment of the invention.

It is obvious that the heating coils 35 on the fuel sources and injectors referenced hereafter in connection with FIGURE 3 also act to maintain and increase the ionization of the gas. However, the primary function of these elements is to provide a means for periodically increasing the gas pressure at the ends of the container and, thus, reciprocating the ionized gas between the ends in a highly efficient manner to conserve the kinetic energy thereof. Since one of the major advantages of the invention resides in the efficiency obtained from the effective conservation of the kinetic energy of the gas, any ionization of the gas produced by the heated coils is only of secondary importance and is not necessary for the purpose of the invention.

More particularly, as is indicated in FIGURE 2a, pressure $P_a$ and a pressure $P_b$ are present at time $t$ adjacent ports 37 and 39, respectively. Accordingly, if the interior or chamber of the exchanger is maintained at an intermediate pressure less than pressure $P_a$ and more than $P_b$ and the ports are opened at time $t$ the difference in gas pressure at points $a$ and $b$, in FIGURE 1, will force gas from section 25 through port 37 and into the chamber of exchanger 17 and will also withdraw heated gas from the exchanger chamber back into section 25. Considering the opening and closing of the valves of ports 37 and 39, the valves should be mechanized to open and close during the period when the pressure in section 25 is at a maximum. For example, the valves can be arranged to open automatically and simultaneously when pressure $P_a$ exceeds the pressure in the exchanger chamber.

Exchanger 19, is similar in structure to exchanger 17 having valved ports 70 and 72 except that the heating coils 35 of exchanger 17 are replaced with cooling fins 38.

As is shown in FIGURE 1, port 70 is located in alignment with point $d$ on the axis of flow while port 72 is in alignment with point $c$ on the axis of flow. Referring to FIGURE 2a, it is apparent that pressure $P_c$ is greater than that of pressure $P_d$ so that if the pressure within the interior or chamber of exchanger 19 is maintained intermediate pressures $P_c$ and $P_d$ at times when the ports are opened gas from the higher pressure area at point C will be forced into port 72 and exchanger 19 whereby heat will be removed while cooled gas will be withdrawn into the reduced pressure at point $d$ from the exchanger chamber.

Referring now specifically to the manner in which the kinetic energy of the relatively high velocity ionized gas is converted into electrical energy, attention is directed to throat 29 of container 15. As is shown in FIG. 1, positioned within the throat of the container are two parallel conductive plates having planar surfaces oriented substantially parallel with the direction of gas flow and the magnetic force lines developed by magnet 21, the force lines traversing the throat area of the container and being substantially orthogonal to the direction of gas flow. In connection with the generation of the magnetic field, it should be noted that while magnet 21 is shown as a conventional permanent magnet, an electromagnet could just as easily be utilized in place of the permanent magnet shown in FIGURE 1.

Referring again to conductive plates 23 positioned within container 15, the plates should be positioned opposite one another and substantially contiguous with the interior walls of the container, one of a pair of output conductors being connected to one plate and the other of the pair of output conductors being connected to the other plate, both the conductors running through the container wall to load 40.

Examining now the specific effect of the magnetic field upon the charged electrons and ions of the ionized gas mass it should again be noted that the directional flow of the charged particles is in the average orthogonal to the magnetic field. Recalling that it can be shown that when charged particles are moving at right angles to an existing magnetic field, the magnetic field generated by the moving particles will react with the existing field to exert a force on the charged particles which is mutually perpendicular to the existing magnetic field as well as to the direction of motion of the charged particles it is apparent that the charged particles will be forced against plates 23. More particularly, since the direction of the force depends on the sign of the charge of the particles, the electrons will be driven against one of the plates 23 and the ions or positive charged particles against the other of the plates whereby an electromotive potential is generated across the plates which causes a current to flow from one plate over the output conductor through load 40 to the other plate. The magnitude of the induced voltage and resulting current is, of course, dependent upon the velocity of the gas mass, the number of particles ionized, and the magnitude of the magnetic field.

As has been previously discussed, the number or percentage of molecules of the gas which is ionized are relatively low. However, the overall efficiency of the generator is extremely high since the kinetic energy of the unionized gas particles which pass through the magnetic field is not lost but is recovered by the re-compression phase of the oscillation, and then transformed back into velocity on the next pass through the magnetic field.

It should be apparent to one skilled in the art that numerous modifications and alterations can be made in the embodiment shown in FIG. 1 without departing from the present invention. For example, the heat exchangers can be located within container 15 rather than outside the container as is shown in FIG. 1. In addition, both a heating and cooling exchanger could be operated off the same end of the container rather than at opposite ends as is shown in FIG. 1. However, in this situation the two exchangers should operate alternately on the half cycle rather than concurrently as in the embodiment shown in FIG. 1. In addition, the embodiment could be modified to utilize one pair of heating exchangers as well as one pair of cooling exchangers, one heating exchanger and one cooling exchanger at each end of the container, the heating exchanger at one end operating in unison with the cooling exchanger at the other end and vice versa a half cycle apart. In addition to the modifications of the embodiment shown in FIG. 1 numerous other different embodiments of the invention can be mechanized without departing from the basic concepts of the invention.

More particularly, there is shown in FIG. 3 another embodiment of the invention wherein a dumbbell shaped container 15 has an exhaust port 41 positioned in the throat section 29 of the container and a pair of fuel injectors 45 and a pair of valved intake ports 47 positioned in the container wall, one of the injectors and one of the fuel ports positioned at one end of the dumbbell shaped container while the other fuel injector and port are positioned at the other end of the container. As is indicated in FIG. 3 the fuel injectors are connected to a fuel source such as an oil or gas source while the ports are connected to a source of gas such as air.

In operation, the device operates in a manner similar to a free piston diesel engine, the piston being simulated by the reciprocation of the gas mass from one side of the container to the other. More particularly, the valves and injectors are connected to a timing source 43 which actuates the valves to alternately emit fresh air under pressure into the container in accordance with the frequency of oscillation of the gas mass within the container. The injectors are, on the other hand, actuated to atomize fuel when the gas pressure adjacent the fuel ejector is at its highest point. In this manner, the pressure oscillations of the reciprocating gas are reinforced at the proper time to sustain oscillation. As has been previously stated exhaust port 41 located in the throat of container 15 is operable to remove exhaust products and heat from the container.

Accordingly, it should be apparent from the foregoing that an unlimited number of modifications and alterations may be made in the embodiments of inventions shown herein without departing from the invention. Hence, it is expressly understood that the scope of the invention is to be limited only by spirit and scope of the appended claims.

What is claimed is:

1. In a magneto-hydrodynamic generator for transforming kinetic energy of an ionized gas into electrical energy, the combination comprising: an elongated container having first and second opposite ends; a mass of ionized gas particles positioned within said container; first means for generating a magnetic field traversing a portion of the interior of said container; and second means positioned in proximity with said first end for heating said gas at predetermined intervals to cause said gas mass to reciprocate between said first and second ends with a frequency representative of the predetermined interval, said gas mass passing through said magnetic field alternately in opposite directions for generating an electromotive potential, said second means including apparatus for abstracting from said mass of ionized gas particles within said container a predetermined amount of heat energy.

2. The combination defined in claim 1 wherein the portion of said container traversed by said magnetic field has a reduced interior cross-section whereby the velocity of said gas is relatively high when passing through said magnetic field.

3. A magneto-hydrodynamic generator for converting thermal energy into electrical energy, said combination comprising: a container with a resonant acoustic frequency having a central region and first and second end regions positioned on opposite sides of said central region; first means for generating a magnetic field across the interior of said central region; a gas mass positioned within said container; a pair of conductors positioned opposite each other in said central region; an input heat exchanger selectively connected to said first end region of said container by first input apparatus and first output apparatus for adding increments of thermal energy to said gas mass; and second means for selectively opening and closing said input and output apparatus to connect said heat exchanger to said container at intervals substantially equal to the period of the resonant frequency of said container and at times when the gas pressure within said first end region is at substantially its maximum value to actuate said gas mass to oscillate between the end regions of said container at the resonant frequency of said container so that said gas continuously traverses said magnetic field to generate an electromotive potential across said pair of conductors.

4. The combination defined in claim 3 which further includes a cooling exchanger having a second input apparatus and a second output apparatus for selectively connecting said exchanger to said second end region of said container to remove increments of thermal energy from said gas mass and wherein said second means further includes apparatus for selectively opening and closing said second input and output apparatus to connect said sink heat exchanger to said container at intervals substantially equal to the period of the resonant frequency of said container and at times when the gas pressure within said second end region is at substantially its minimum value.

5. The combination defined in claim 4 wherein each of said first input and output apparatus and said second input and output apparatus includes a valved port, the opening and closing of the valves being under the control of said second means.

6. The combination defined in claim 5 wherein said container has a double-funnelled shape.

7. A magneto-hydrodynamic generator for converting kinetic energy into electrical energy, said combination comprising: a container with a resonant acoustic frequency having a central region and first and second end regions positioned on opposite sides of said central region, said central region having a cross-sectional area substantially less than that of said first and second end regions; first means for generating a magnetic field across the interior of said central region; a source of gas; a pair of first and second valved ports connecting said source of gas to said first and second end regions, respectively, of said container for selectively connecting said gas source to the interior of said container; a source of fuel; a pair of first and second injectors connected to said first and second end regions, respectively, of said container for selectively connecting said fuel source to the interior of said container to inject fuel into said container; timing means connected to said injectors and said valved ports for periodically opening with a frequency substantially equal to the resonant frequency of said container said injectors and said valved ports, the opening of said first and second valved ports being substantially 180 degrees out of phase with one another and said injectors being opened substantially 180 degrees out of phase with one another.

8. In a magneto-hydrodynamic generator having a closed cycle working fluid for transforming the kinetic energy of an ionized gas into electrical energy, the combination comprising: a closed container having an axis; a mass of ionized gas positioned in said container; first means for generating a magnetic field within said container; and second means for heating said ionized gas to cause said gas to reciprocate along said axis at a predetermined resonant frequency determined in conjunction with the configuration of said container to pass through said magnetic field to generate an electromotive potential.

9. In a magneto-hydrodynamic generator having a closed cycle working fluid for transforming the kinetic energy of an ionized gas into electrical energy, the combination comprising: a closed elongated container having first and second ends positioned a predetermined distance apart determining a natural resonant to frequency; a mass of ionized gas positioned within said container; first means for generating a magnetic field traversing a portion of the interior of said container; and second means for reciprocating said gas particles between said first and second ends, said second means including apparatus for applying heat to said gas particles at predetermined intervals, the intervals corresponding to the period of resonant frequency of said container.

10. In a magneto-hydrodynamic generator having a closed cycle working fluid for transforming kinetic energy of an ionized gas into electrical energy, the combination comprising: a closed elongated container having first and second ends; and a mass of ionized gas particles positioned within said container; first means for generating a magnetic field traversing a portion of the interior of said container; and second means positioned in proximity with said first end for heating said gas at predetermined intervals to cause said gas mass to reciprocate between first and second ends with a frequency representative of the predetermined interval, said gas mass passing through said magnetic field alternately in opposite directions for generating an electromotive potential.

11. In a magneto-hydrodynamic generator having a closed cycle working fluid for transforming kinetic energy of an ionized gas into electrical energy, the combination comprising: a closed elongated container having first and second opposite ends; a mass of ionized gas particles positioned within said container; first means for generating a magnetic field traversing a portion of the interior of said container; and second means positioned in proximity with said first end for heating said gas at predetermined intervals to cause said gas mass to reciprocate between said first and second ends with a frequency representative of the predetermined interval, said gas mass passing through said magnetic field alternately in opposite directions for generating electromotive potential, said second means including apparatus for abstracting from said mass of ionized gas particles within said container a predetermined amount of heat energy.

References Cited by the Examiner

UNITED STATES PATENTS

| 957,242 | 5/1910 | Noeggerath | 310—11 |
| 2,258,415 | 10/1941 | Lago | 310—11 X |
| 2,731,795 | 1/1956 | Bodine | 310—11 X |
| 3,185,871 | 5/1965 | Bodine | 310—11 |

FOREIGN PATENTS 1,161,079  3/1958  France.

OTHER REFERENCES

Publication: Plasma Reactor Promises by Colgate et al., Nucleonics, August 1957, pp. 50 to 54.

MILTON O. HIRSHFIELD, *Primary Examiner.*

ORIS L. RADER, *Examiner.*

DAVID X. SLINEY, *Assistant Examiner.*